United States Patent
Moore et al.

(10) Patent No.: US 12,078,259 B2
(45) Date of Patent: Sep. 3, 2024

(54) FLOW CONTROL VALVE

(71) Applicant: D.T. Davis Enterprises, Ltd., Allentown, PA (US)

(72) Inventors: Scott D. Moore, Bethlehem, PA (US); John F. Englebert, Bethlehem, PA (US)

(73) Assignee: D.T. Davis Enterprises, Ltd., Allentown, PA (US)

( * ) Notice: Subject to any disclaimer, the term of this patent is extended or adjusted under 35 U.S.C. 154(b) by 1170 days.

(21) Appl. No.: 15/734,433

(22) PCT Filed: Mar. 30, 2018

(86) PCT No.: PCT/US2018/025309
§ 371 (c)(1),
(2) Date: Dec. 2, 2020

(87) PCT Pub. No.: WO2018/183784
PCT Pub. Date: Oct. 4, 2018

(65) Prior Publication Data
US 2021/0364094 A1    Nov. 25, 2021

Related U.S. Application Data

(60) Provisional application No. 62/479,433, filed on Mar. 31, 2017.

(51) Int. Cl.
*F16K 3/26* (2006.01)
*A47C 27/08* (2006.01)
(Continued)

(52) U.S. Cl.
CPC .............. *F16K 3/26* (2013.01); *A47C 27/081* (2013.01); *F16K 3/314* (2013.01); *F16K 15/20* (2013.01)

(58) Field of Classification Search
CPC . F16K 3/26; F16K 15/20; F16K 3/314; A47C 27/081; A47C 27/082; A47C 27/08; A47C 27/10; A47C 27/128; A47C 27/18
See application file for complete search history.

(56) References Cited

U.S. PATENT DOCUMENTS 1,490,628 A   4/1924   Myers
1,923,890 A   8/1933   Scudder
(Continued)

FOREIGN PATENT DOCUMENTS

CN         2632437 Y       8/2004
CN       103727256 A   *   4/2014
(Continued)

OTHER PUBLICATIONS

Korean Intellectual Property Office (ISA), International Search Report and Written Opinion issued in International Patent Application No. PCT/US2018/025309, dated Jul. 17, 2018.
(Continued)

*Primary Examiner* — David R Hare
*Assistant Examiner* — George Sun
(74) *Attorney, Agent, or Firm* — Duane Morris LLP

(57) ABSTRACT

A valve includes a valve seat and a valve stem. The valve seat includes a seat body defining a stem channel and a sealing element. The valve stem includes a stem body sized and configured for insertion into the stem channel having a proximal end, a distal end, and a surface extending therebetween. The stem body defines a channel extending from the proximal end to the distal end and defines at least one opening extending through the surface to the channel. A coupling element is formed over at least a portion of the surface of the valve stem and configured to provide advancement of the valve stem within the stem channel in a distal or proximal direction.

20 Claims, 7 Drawing Sheets

(51) Int. Cl.
*F16K 3/314* (2006.01)
*F16K 15/20* (2006.01)

(56) References Cited

U.S. PATENT DOCUMENTS

| | | | | |
|---|---|---|---|---|
| 3,147,763 | A * | 9/1964 | Morton | A47C 27/081 |
| | | | | 251/351 |
| 4,766,628 | A * | 8/1988 | Walker | A47C 27/082 |
| | | | | 137/232 |
| 5,203,831 | A | 4/1993 | Lind et al. | |
| 6,929,020 | B1 | 8/2005 | Rogers | |
| 2003/0215340 | A1 * | 11/2003 | Chung | F04D 29/503 |
| | | | | 5/706 |
| 2005/0056314 | A1 * | 3/2005 | Lin | A47C 27/081 |
| | | | | 137/223 |
| 2006/0016488 | A1 * | 1/2006 | Hwang | A47C 27/081 |
| | | | | 137/599.18 |
| 2009/0179167 | A1 | 7/2009 | Smith et al. | |
| 2016/0061340 | A1 * | 3/2016 | Shen | F16K 17/06 |
| | | | | 5/706 |
| 2021/0131571 | A1 * | 5/2021 | Johnson | B67D 3/0067 |

FOREIGN PATENT DOCUMENTS

| | | | |
|---|---|---|---|
| CN | 204784890 U | | 11/2015 |
| CN | 113309870 A | * | 8/2021 |
| DE | 29619104 U | | 12/1997 |
| DE | 102015203678 B3 | * | 6/2016 |
| EP | 1574768 B1 | | 11/2006 |
| FR | 1061440 A | | 4/1954 |
| FR | 2379001 A1 | | 8/1978 |
| FR | 2862738 A1 | * | 5/2005 |
| GB | 137844 A | * | 3/1921 |
| GB | 2427005 A | * | 12/2006 |
| GB | 2512228 A | * | 9/2014 |
| KR | 20200038740 A | * | 4/2020 |
| WO | 2005000074 A1 | | 1/2005 |
| WO | WO-2016059179 A1 | * | 4/2016 |
| WO | WO-2019082198 A1 | * | 5/2019 |
| WO | WO-2020210091 A1 | * | 10/2020 |
| WO | WO-2020257300 A1 | * | 12/2020 |

OTHER PUBLICATIONS

Australian Patent Office, Full Examination Report issued in corresponding Australian Patent Application No. 2018243466, dated Feb. 17, 2021.

European Patent Office, Extended European Search Report issued in corresponding European Patent Application No. 18775696.0, dated Nov. 5, 2020.

Extended European Search Report for corresponding European Patent Application No. 23214469.1 dated May 8, 2024, 9 pages.

* cited by examiner

FLOW CONTROL VALVE

CROSS-REFERENCE TO RELATED APPLICATION

This application claims the benefit of U.S. Provisional Application Ser. No. 62/479,433, filed on Mar. 31, 2017, and entitled "ONE-WAY DUMP VALVE," which is incorporated by reference herein in its entirety.

BACKGROUND

Immobility and prolonged confinement present both psychological and physically evident pathological problems to patients, ranging from malaise, depression, feelings of helplessness and loss of motivation on the one hand to decubitus ulcers, loss of local circulation and unsanitary dermatologic insult from waste products, or edema of extremities and gangrene on the other. Not only are patients affected by these conditions but so too are the caregivers and clinicians who must lift, turn, wash, change bedding and clothes, arrange for food, treat, and dispose of waste. Such operations often require that attendants have a high level of strength and skill to move and reposition the patient, regardless of the patient's size or weight.

Patient handling mattresses are known in the art which include at least two flexible material sheets, that together define a plenum chamber, with at least one sheet being perforated with small pinholes over at least a central surface area, and which open up directly to the interior of the plenum chamber. Such prior art mattresses are used by arranging the perforated sheet so that it faces an underlying fixed, generally planar support surface, such as a floor or table. When the mattress is charged with pressurized air, the escape of air under pressure through the pinholes acts initially to jack a load placed upon the mattress above the perforated flexible sheet, and thereby creates an air bearing of relatively small height between the underlying fixed, generally planar support surface and the perforated flexible sheet. Current patient handling mattresses provide valves for deflation but fail to provide detailed control of pressure during inflation and/or deflation.

SUMMARY

In various embodiments, a flow control valve is disclosed. The valve includes a valve seat and a valve stem. The valve seat includes a seat body defining a stem channel and a sealing element. The valve stem includes a stem body sized and configured for insertion into the stem channel having a proximal end, a distal end, and a surface extending therebetween. The stem body defines a channel extending from the proximal end to the distal end and defines at least one opening extending through the surface to the channel. A coupling element is formed over at least a portion of the surface of the valve stem and configured to provide advancement of the valve stem within the stem channel in a distal or proximal direction.

In various embodiments, an inflatable mattress is disclosed. The inflatable mattress includes a mattress body and a flow control valve extending through the mattress body. The mattress body includes a top panel having a first perimeter and a bottom panel having a second perimeter. The first perimeter of the top panel is coupled to the second perimeter of the bottom panel. The flow control valve includes a valve seat and a valve stem. The valve seat includes a seat body defining a stem channel and a sealing element. The valve stem includes a stem body sized and configured for insertion into the stem channel having a proximal end, a distal end, and a surface extending therebetween. The stem body defines a channel extending from the proximal end to the distal end and defines at least one opening extending through the surface to the channel. A coupling element is formed over at least a portion of the surface of the valve stem and configured to provide advancement of the valve stem within the stem channel in a distal or proximal direction.

In various embodiments, a method is disclosed. The method includes the step of coupling an inflation hose to a flow control valve formed integrally with an inflatable device. The flow control valve includes a valve seat including a seat body defining a stem channel and a sealing element, a valve stem having a stem body having a proximal end, a distal end, and a surface extending therebetween and sized and configured for insertion into the stem channel, and a coupling element formed over at least a portion of the surface of the valve stem and configured to provide advancement of the valve stem within the stem channel in a distal or proximal direction. The valve stem defines a channel extending from the proximal end to the distal end and defines at least one opening extending through the surface to the channel. A positive air flow is provided from the air supply hose to the flow control valve. The positive air flow moves a plunger positioned within the channel from a first position to a second position to establish an airflow path between a proximal opening of the channel and the at least one opening formed through the surface of the stem body when the plunger is in the second position. The inflatable device is inflated using the positive air flow and the positive air flow is removed from the air supply hose to the flow control valve after inflation. The plunger moves from the second position to the first position when the positive airflow is removed and is configured to seal the proximal end of the channel in the first position.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
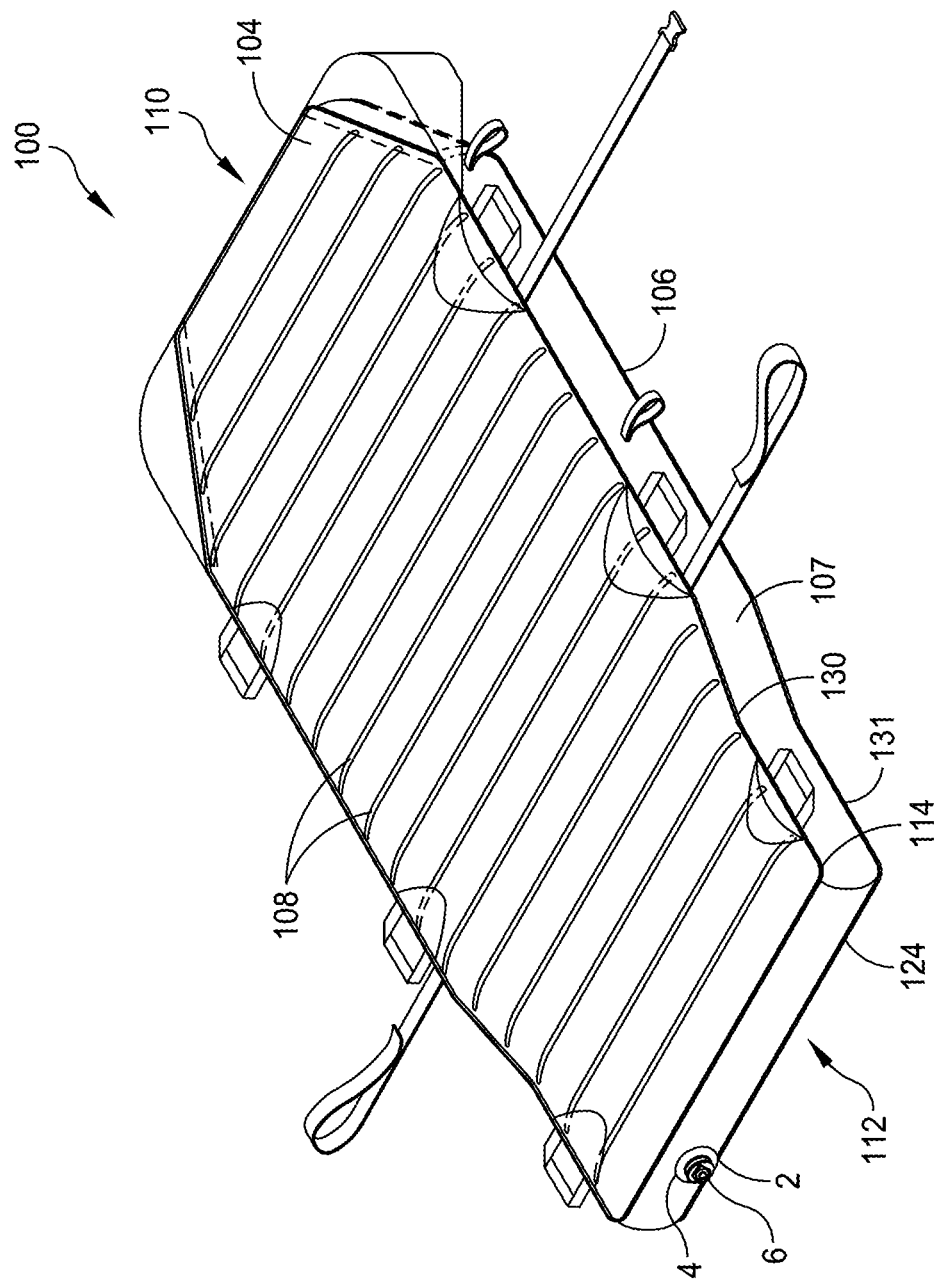
FIG. 1 illustrates an inflatable mattress including a flow control valve, in accordance with some embodiments.
Figure 3:
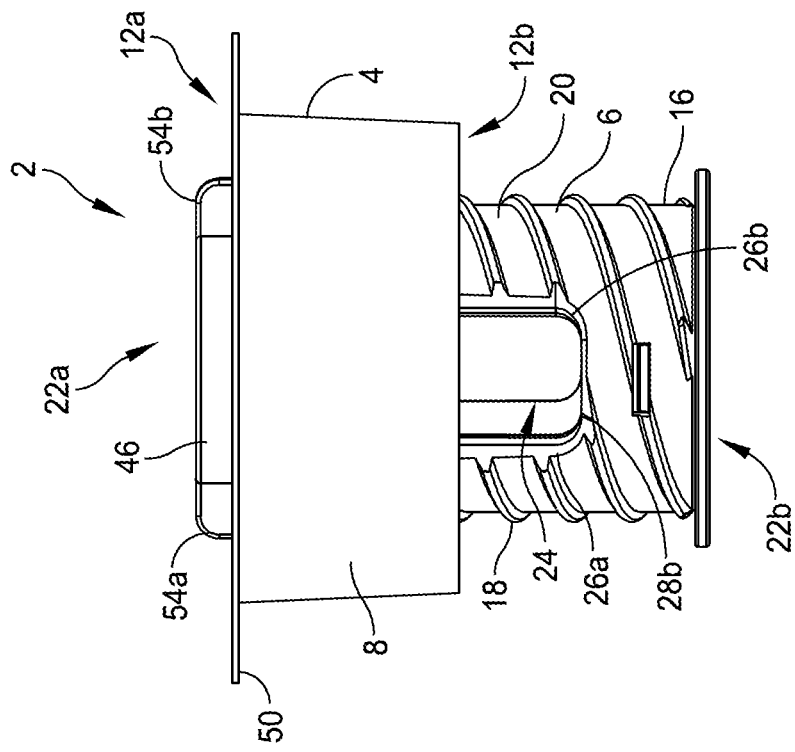
FIG. 3 illustrates a front view of the flow control valve of FIG. 2, in accordance with some embodiments.
Figure 2:
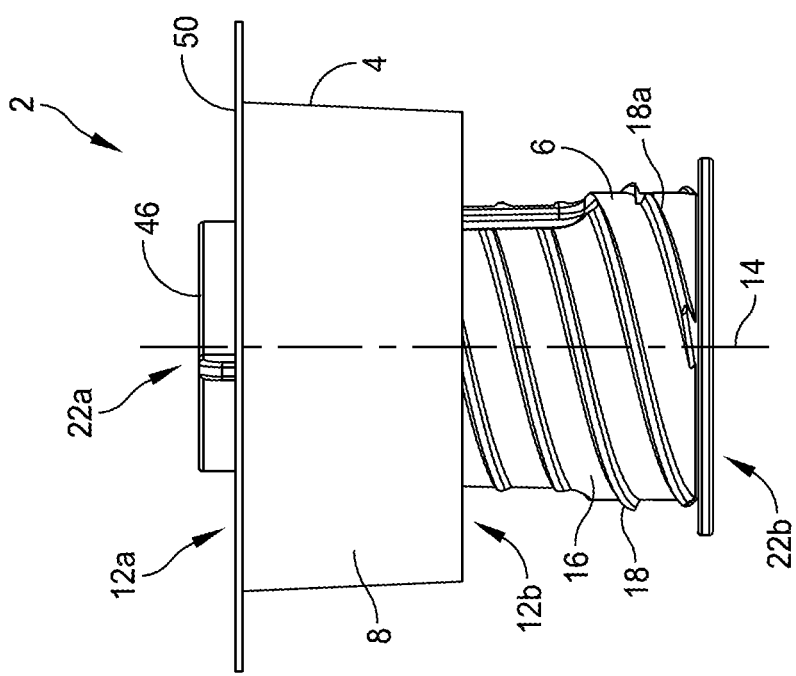
FIG. 2 illustrates a side view of a flow control valve, in accordance with some embodiments.
Figure 5:
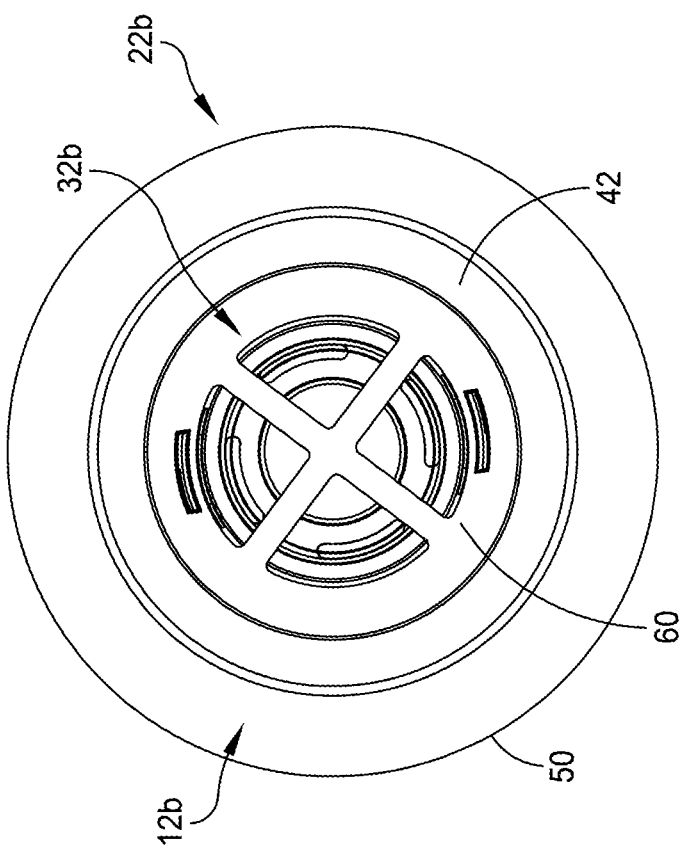
FIG. 5 illustrates a bottom view of the flow control valve of FIG. 2, in accordance with some embodiments.
Figure 4:
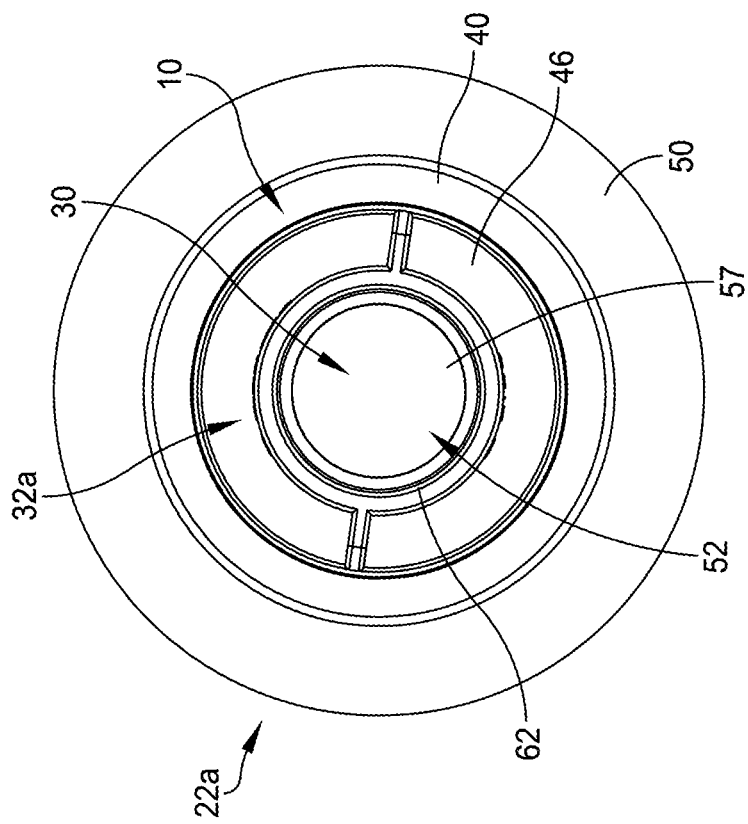
FIG. 4 illustrates a top view of the flow control valve of FIG. 2, in accordance with some embodiments.
Figure 7:
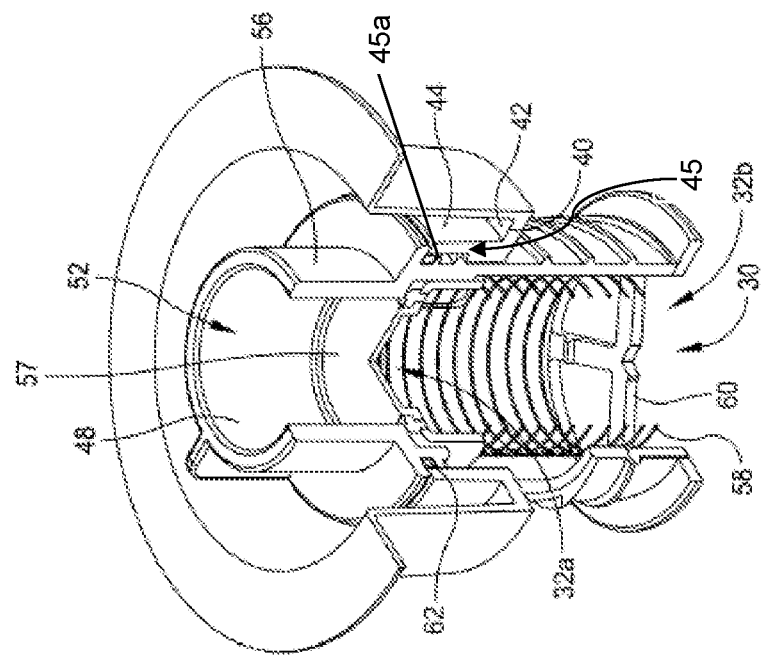
FIG. 7 illustrates a partial cross-section of the flow control valve taken along lines A-A and B-B of FIG. 6, in accordance with some embodiments.
Figure 6:
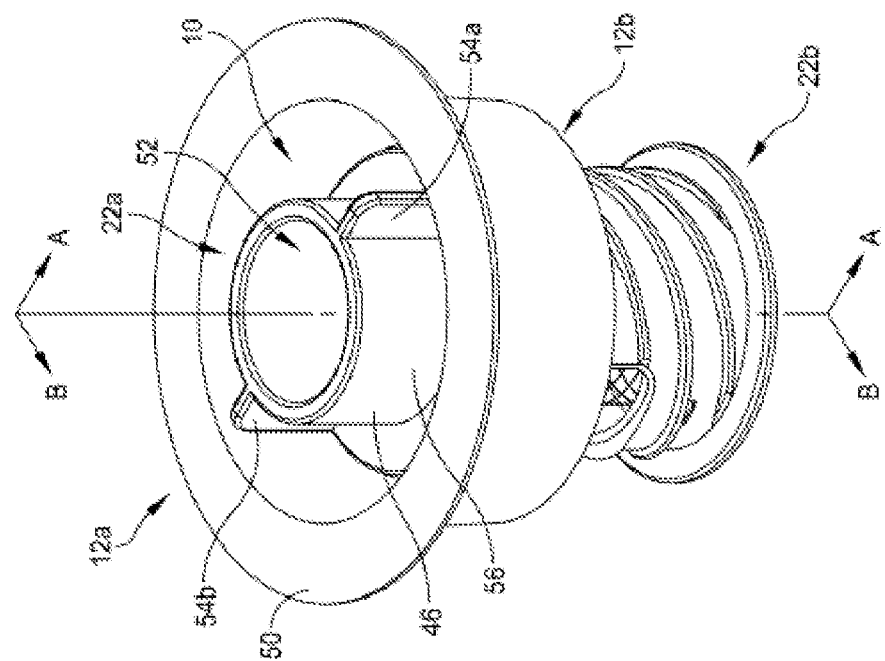
FIG. 6 illustrates an isometric view of the flow control valve of FIG. 2, in accordance with some embodiments.
Figure 8:
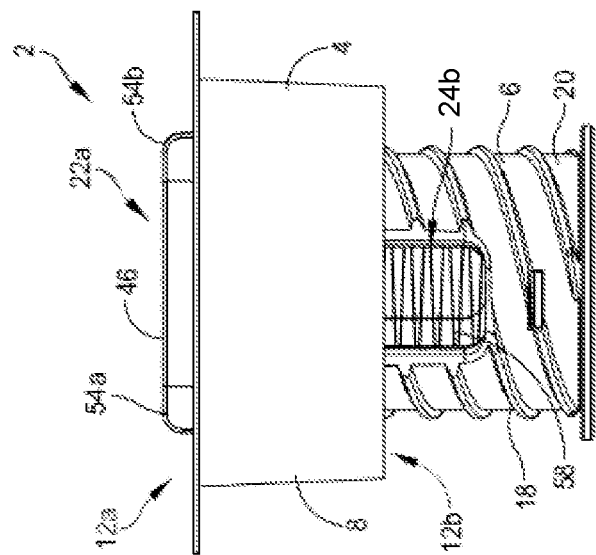
FIG. 8 illustrates an isometric view of the flow control valve of FIG. 2 in a full deflation position, in accordance with some embodiments.

The description of the preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise. The term "operatively coupled" is such an attachment, coupling, or connection that allows the pertinent structures to operate as intended by virtue of that relationship. In the claims, means-plus-function clauses, if used, are intended to cover structures described, suggested, or rendered obvious by the written description or drawings for performing the recited function, including not only structure equivalents but also equivalent structures.

In various embodiments, a flow control valve is disclosed. The flow control valve includes a valve seat and a valve stem. The valve seat includes a seat body defining a stem cavity extending from an upper surface of the seat body to a lower surface of the seat body. The stem cavity is sized and configured to receive the valve stem therein. The valve stem includes a stem body extending from a proximal end to a distal end and defining a channel that extends from a proximal opening to a distal opening. The body further defines at least one opening formed in a sidewall of the body. The opening extends from an outer surface of the sidewall to the channel. The opening has a longitudinal axis parallel to a long axis of the body and extends over at least portion of the body. The valve stem further includes one or more coupling elements configured to couple the valve stem to the stem cavity of the sealing body. The coupling elements are configured to allow the valve stem to be positioned at a plurality of positions between a fully closed (or inflation) position and a fully open (or full deflation) position with respect to the valve seat.

FIG. 1 illustrates an inflatable mattress 100 including a flow control valve 2, in accordance with some embodiments. The inflatable mattress 100 includes a top panel 104, a bottom panel 106, a perimeter band 107, and a plurality of baffle-panels 108. The inflatable mattress 100 defines a head portion 110 and a foot portion 112. The top panel 104 includes a peripheral edge 114 and the bottom panel 106 includes a peripheral edge 124. The perimeter band 107 can include an elongate substantially rectangular strip, having a top edge 130 and a bottom edge 131. In some embodiments, top panel 104 and bottom panel 106 are substantially the same size and include substantially similar peripheral profiles such that top panel 104 and the bottom panel 106 are substantially parallel when the top edge 130 and bottom edge 131 of perimeter band 107 is sealingly fastened to peripheral edges 114 and 124. Although embodiments including an inflatable mattress 100 are discussed herein, it will be appreciated that the flow control valve 2 can be coupled to and/or used with any suitable inflatable device.

A flow control valve 2 is coupled to a portion of the inflatable mattress 100. For example, in the illustrated embodiment, the flow control valve 2 is coupled to the perimeter band 107, although it will be appreciated that the flow control valve 2 can be positioned at least partially on the top panel 104, the perimeter band 107, and/or the bottom panel 106. The flow control valve 2 is configured to accept and/or couple to an air supply hose in an air-tight configuration. The flow control valve 2 is configured to receive the air supply hose and provide airflow into an inner volume of the inflatable mattress 100 in an inflation position. The flow control valve 2 is selectively movable from the inflation position to a partial deflation and/or full deflation position to allow airflow from the inner volume of the inflatable mattress 100 (i.e., deflation of the inflatable mattress 100). In some embodiments, the flow control valve 2 provides selective deflation of the inflatable mattress 100 in an inflation position.

In some embodiments, the flow control valve 2 includes a valve seat 4 coupled to the inflatable mattress 100 and a valve stem 6 selectively moveable from a first position (such as a distal position) to a second position (such as a proximal position) with respect to the valve seat 6. The flow control valve 2 is configured to receive inflation (e.g., positive) airflow from the air supply hose in the first position and provide deflation (e.g., negative) airflow from the inflated mattress 100 in the second position. Although embodiments are shown including a flow control valve 2 coupled to a perimeter band 107, it will be appreciated that the perimeter band 107 can be omitted and the flow control valve 2 can be coupled to one of the top panel 104 and/or the bottom panel 106. Additional embodiments of inflatable devices are disclosed in U.S. Pat. No. 7,266,852, issued Sep. 11, 2007, entitled "Inflatable Transfer Mattress," U.S. Pat. No. 7,406,723, issued Aug. 5, 2008, entitled "Inflatable Mattress and Method for Positioning a Patient," and U.S. Pat. No. 8,387,177, issued Mar. 5, 2013, entitled "Partially Deflatable Transfer Mattress and Method for Transporting a Patient in Comfort," and U.S. Patent App. Pub. No. 2008/0104762, published May 8, 2008, entitled "Transfer Mattress with Device Portal," each of which is incorporated herein by reference it their entireties.

FIGS. 2-10 illustrate a flow control valve 2, in accordance with some embodiments. The flow control valve 2 includes a valve seat 4 and a valve stem 6. The valve seat 4 includes a seat body 8 defining a stem cavity 10. The seat body 8 extends from a proximal end 12a to a distal end 12b substantially along a first longitudinal axis 14. In the illustrated embodiment, the seat body 8 defines a cylindrical shape, although it will be appreciated that valve seat 4 can include any suitable shape, such as hyperrectangle (e.g., a prism, cuboid, parallelepiped, etc.), ovoid, pyramid, and/or any other suitable shape. The stem cavity 10 extends from the proximal end 12a to a distal end 12b of the seat body 8 substantially along a second longitudinal axis. In the illustrated embodiment, the second longitudinal axis is substantially parallel with and overlapping with the first longitudinal axis 14 of the seat body 8, although it will be appreciated that the second longitudinal axis can be non-parallel with and/or offset from the first longitudinal axis 14. The valve seat 4 is configured to be coupled to and extend through an outer surface of an inflatable device, such as an inflatable mattress 100.

In some embodiments, the seat body 8 includes a sealing ring 50 extending from a proximal end 12a. The sealing ring 50 is configured to extend over a portion of the inflatable device, such as the inflatable mattress 100, to provide an air tight seal between the inflatable device and the valve seat 4. The valve seat body 8 and/or the sealing ring 50 are configured to be coupled to an outer surface of the inflatable mattress 100. For example, in some embodiments, the valve seat body 8 is sized and configured to be inserted through a hole formed in a perimeter band 107 of an inflatable mattress 100. The valve seat body 8 is inserted until the sealing ring 50 is in contact with the perimeter band 107. In some embodiments, the valve seat body 8 and/or the sealing ring 50 include a material, such as a radiofrequency (RF) weldable material, configured to be fixedly coupled to the inflatable mattress 100. For example, in embodiments including an RF weldable material, RF energy can be applied to the sealing ring 50 to couple the sealing ring 50 to the perimeter band 107 about the entire circumference of the sealing ring 50. In some embodiments, the sealing ring 50 and/or the seat body 8 can be coupled to the inflatable mattress 100 using, for example, an adhesive, RF welding, tape, any other suitable coupling element, and/or any combination thereof. The seat body 8 and/or the sealing ring 50 generate an air-tight bond with the perimeter band 107.

The valve stem 6 includes a stem body 16 extending from a proximal end 22a to a distal end 22b substantially along a stem longitudinal axis. The stem body 16 is sized and configured for insertion into the stem cavity 10 such that the stem longitudinal axis is substantially parallel and overlapping with the first longitudinal axis 14 and/or the second longitudinal axis of the valve seat 4. In some embodiments, the stem body 16 has a cylindrical shape, although it will be appreciated that any suitable shape that is complimentary to the shape of the stem cavity 10 can be used. The stem body 16 includes one or more coupling elements 18 configured to maintain the stem body 16 within the stem cavity 10. In some embodiments, the coupling elements 18 are configured to allow adjustment of the stem body 16 to two or more positions within the stem cavity 10. For example, in the illustrated embodiment, the coupling element 18 includes a thread 18a formed about the outer surface 20 of the stem body 16 from the proximal end 22a to the distal end 22b. The thread 18a allows the stem body 16 to be continuously located at any position within the stem cavity 10 between a proximal-most position and a distal-most position. In other embodiments, the coupling elements 18 can include circumferential grooves, circumferential projections, and/or any other suitable coupling element 18. The coupling element 18 can provide a continuous adjustment and/or discrete adjustments within the stem cavity 10.

At least one opening 24 extends through the outer surface 20 of the stem body 16. In the illustrated embodiment, a first opening 24a and a second opening 24b are each defined by a first set of parallel edges 26a, 26b and a second set of parallel edges 28a, 28b defining a generally rectangular shape, although it will be appreciated that the openings 24a, 24b can have any suitable shape, including circular, square, oblong, oval, etc., and is within the scope of this disclosure. The openings 24a, 24b extend through the outer surface 20 to a channel 30 defined by the stem body 16. The channel 30 can extend from the proximal end 22a to the distal end 22b of the stem body 16, from a first edge 28a to a second edge 28b of the openings 24a, 24b, and/or along any other suitable portion of the stem body 16. In some embodiments, the channel 30 includes a proximal opening 32a and a distal opening 32b such that the stem body 16 defines a hollow cylinder. The channel 30 is configured to provide an airflow path from a distal end 22b of the channel 30 to the openings 24a, 24b and an airflow path from the proximal end 22a of the channel 30 to the openings 24a, 24b. For example, when the flow control valve 2 is coupled to an inflatable mattress 100, the channel 30 provides an airflow path to and/or from an interior volume of the inflatable mattress 100.

The openings 24a, 24b can extend partially and/or fully over the length of the stem body 16. In some embodiments, the openings 24a, 24b define interruptions or spacing in the coupling element 18. For example, in the illustrated embodiment, the openings 24a, 24b are formed through the threads 18a and the outer surface 20 of the stem body 16. In other embodiments, the coupling elements 18 are positioned above, below, and/or next to the openings 24a, 24b such that the openings 24a, 24b do not interrupt the coupling elements 18.

The valve stem 6 is sized and configured to be inserted into the stem cavity 10. The valve stem 6 is coupled to the valve seat 4 in an air-tight engagement such that airflow between the outer surface 20 of the valve stem 6 and the surface of the stem cavity 10 is prevented. In some embodiments, a sealing element 40 is configured to engage a portion of the valve stem 6 to provide an airtight seal therebetween. For example, in some embodiments, the valve seat 4 includes a sealing element 40 that extends from a distal end 12b of the seat body 8 at least partially into the stem cavity 10. The sealing element 40 includes a first surface 42 extending substantially perpendicular to the first longitudinal axis 14 and a second surface 44 extending substantially parallel to the first longitudinal axis 14. The first surface 42 positions the second surface 44 within the stem cavity 10 such that second surface 44 contacts the outer surface 20 of the valve stem 6 to create an airtight seal between the outer surface 20 and the sealing element 40. In some embodiments, the second surface 44 defines an engagement element 45 configured to engage and/or couple to the coupling element 18. The engagement element 45 can include any suitable element complimentary to and configured to engage the coupling element 18. For example, in the illustrated embodiment, the engagement element 45 includes a channel 45a sized and configured to engage the thread 18a formed on the outer surface 20 of the stem 6.

In some embodiments, the position of the valve stem 6 within the stem cavity 10 is adjustable. For example, in some embodiments, the one or more coupling elements 18 and/or the engagement element 45 are configured to allow the valve stem 6 to be positioned at two or more positions with respect to the valve seat 4. The two or more positions can include a continuous positions and/or discrete positions. For example, in the illustrated embodiment, the coupling element 18 is a thread 18a formed about the circumference of the outer surface 20 of the stem body 16 and engaged with the channel 45a. The valve stem 6 can be rotated to advance the thread 18a distally and/or proximally, which respectively advances the stem body 16 proximally or distally within the stem cavity 10. In embodiments including additional and/or alternative coupling elements 18, a proximal and/or distal force can be applied to advance the valve stem 6 within the stem cavity 10. For example, in embodiments having discrete positions within the stem cavity 10, a minimum force may be necessary to advance the stem body 16 proximally and/or distally to a subsequent and/or previous discrete position.

In some embodiments, a cap 46 is coupled to a proximal end 22a of the stem body 16. The cap 46 includes a hollow cylinder 48 defining a cap channel 52. In the illustrated embodiment, the cap channel 52 is co-centric with the channel 30 of the stem body 16, although it will be appreciated that the cap channel 52 can be offset from the channel 30. The cap channel 52 can have a circumference less than, equal to, or greater than the circumference of the inner channel 30. For example, in the illustrated embodiment, the cap channel 52 has a circumference less than the circumference of the channel 30. The cap 46 is configured to couple an air supply hose 100 to the valve 2. In some embodiments, the cap channel 52 is sized and configured to receive the air supply hose therein. In other embodiments, the cap 46 includes one or more locking elements for coupling an air supply hose to the cap 46. The cap 46 can be formed integrally with and/or coupled to the stem body 16.

In some embodiments, one or more adjustment elements 54a, 54b extend from an outer surface 56 of the hollow cylinder 48. The adjustment elements 54a, 54b are sized and configured to allow a user to apply an adjustment force to the valve stem 6 to move the valve stem 6 in a proximal and/or distal direction within the stem cavity 10. For example, in the illustrated embodiments, the adjustment elements 54a, 54b include first and second wings extending perpendicular to the longitudinal axis of the hollow cylinder 48 (e.g., along a diameter line of the cylinder). The first and second wings allow a user to apply a rotational force to the valve stem 6, advancing and/or withdrawing the valve stem 6 within the stem cavity 10. In some embodiments, the outer surface 56 can include one or more elements for applying a proximal and/or distal force to advance and/or retract the valve stem 6 with respect to the valve seat 4.

Figure 9:
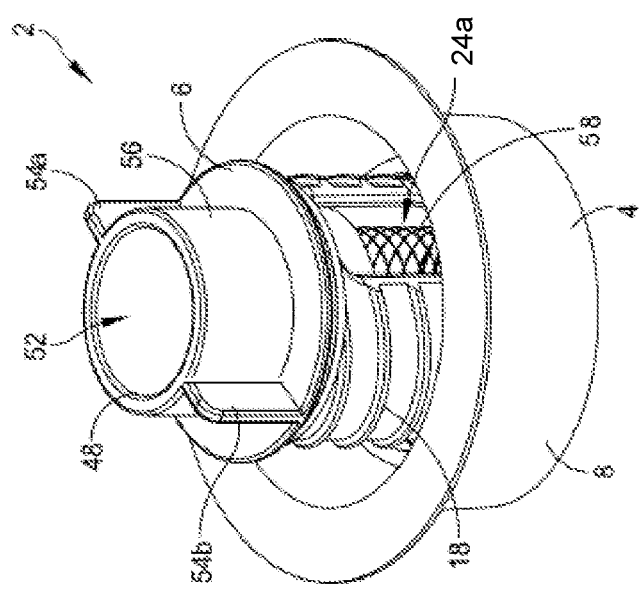
FIG. 9 illustrates a side view of the flow control valve of FIG. 2 in an inflation position, in accordance with some embodiments.

FIG. 9 illustrates the flow control valve 2 in a distal-most, or inflation, position, in accordance with some embodiments. In the inflation position, the openings 24a, 24b formed through the stem body 16 is positioned below a distal end 12b of the valve seat 4. When airflow is provided to the channel 30 (for example, by coupling an air supply hose to the cap 46), airflows from the proximal end of the channel 30 and through the openings 24a, 24b. Because the opening 24 is positioned below the distal end 12b of the valve seat, air flows into a volume positioned beneath the distal end 12b of the valve seat, e.g., an inner volume of an inflatable mattress 100.

Figure 11:
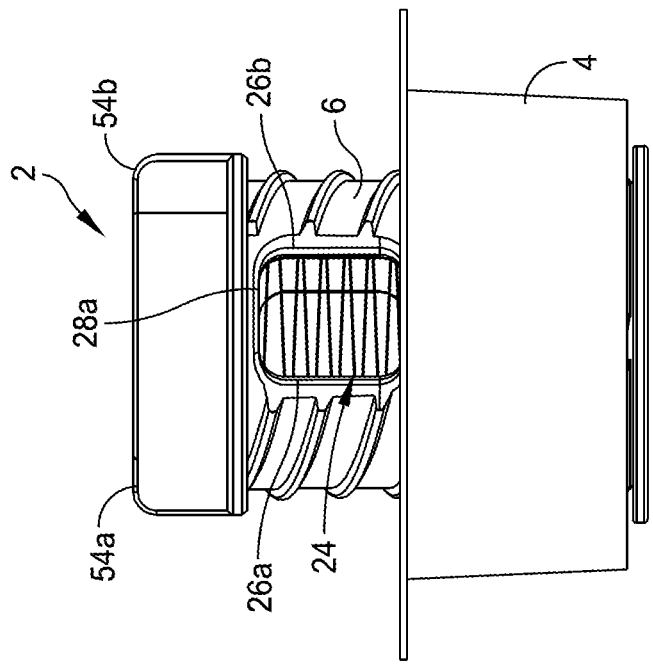
FIG. 11 illustrates a side view of the flow control valve of FIG. 2 in a full deflation position, in accordance with some embodiments.
Figure 10:
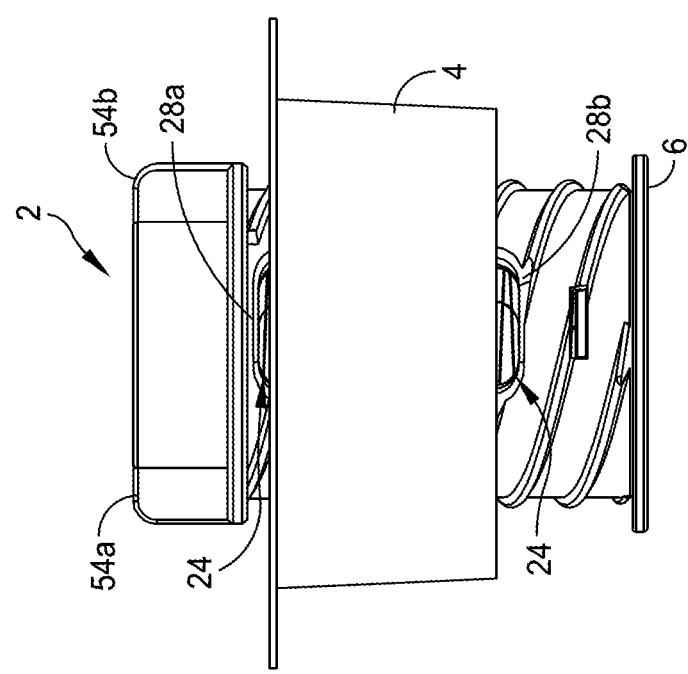
FIG. 10 illustrates a side view of the flow control valve of FIG. 2 in a partial deflation position, in accordance with some embodiments.

When deflation is desired, the valve stem 6 can be advanced proximally from the inflation position to a partial deflation position, as shown in FIG. 10, or a full deflation (or dump) position, as shown in FIG. 11. As the valve stem 6 is advanced proximally, the openings 24a, 24b are transitioned from beneath a distal end 12b of the valve seat 4 to a position proximal of the sealing element 40 and exposed within the stem cavity 10. When a portion of an opening 24a, 24b extends above the sealing element 40, airflow is permitted to flow from the inner volume defined by the inflatable mattress 100 (e.g., negative airflow). For example, when a portion of an opening 24a, 24b is positioned above the sealing element 40, an airflow path is established from a distal channel opening 32b and/or a distal portion of the openings 24a, 24b to a proximal portion of the openings 24a, 24b positioned proximal to the sealing element 40.

As the valve stem 6 is further advanced proximally, more of the openings 24a, 24b are exposed and the rate of airflow from the inner volume increases. The valve stem 6 can be maintained in a partial deflation position (for example, as shown in FIG. 10) or advanced proximally to a full deflation position (as shown in FIG. 11). The location of the valve stem 6 between the inflation position and the full deflation position can be adjusted to control the rate of airflow from the inner volume. When the valve stem 6 is positioned in the full deflation position, a maximum portion of the openings 24a, 24b are positioned above the sealing element 40 and allows the highest airflow rate out of the internal volume of the inflatable mattress 100.

As illustrated in FIGS. 7-10, in some embodiments, a flow control element 56 is disposed within the channel 30 and/or the cap channel 52. The flow control element 56 is configured to allow airflow from an air supply hose in a first direction (e.g., positive airflow from a proximal end 22a to a distal end 22b of the channel 30) while preventing airflow in a second direction (e.g., negative airflow from a distal end 22b to a proximal end 22a of the channel 30). The flow control element 56 can include any suitable element configured to allow airflow in the first direction and prevent airflow in the second direction. In some embodiments, the flow control element includes a moveable element configured to be positioned in a first position to allow airflow in the first direction and positioned in a second position to prevent airflow in the second direction. The flow control element 56 can include any suitable flow control element, such as, for example, a plunger, a flap, a door, a sealing aperture, and/or any other suitable control element.

For example, in the illustrated embodiment, a plunger 57 is positioned within the channel 30. The plunger 57 is configured to move from a first, or proximal, position within the channel 30 to a second, or distal, position when an airflow is provided into the channel 30 from the cap channel 52 (e.g., positive airflow from the air supply hose). In the proximal-most position, the plunger 57 forms an airtight seal with the proximal end of the cap 50 which prevents airflow from the channel 30 to the cap channel 52 and therefore prevents airflow from the inner volume of the inflatable mattress 100. In some embodiments, an O-ring 62 is positioned between the plunger 57 and the distal end of the rotation cap 46 to further provide an airtight seal. When airflow is provided into the proximal end of the cap channel 52 (for example, from the air supply hose), the plunger 57 is driven distally, allowing airflow from the cap channel 52 through the channel 30 and into the internal volume of the inflatable mattress 100. For example, air may flow from a proximal end 22a of the channel 30 through the one or more openings 24 formed in the valve stem 6. After the airflow is stopped, the plunger 57 is repositioned at a proximal-most position to form an airtight seal with the proximal end of the cap 46.

The plunger 57 can be maintained in a proximal-most position by any suitable mechanism. For example, in some embodiments, a spring 58 is positioned distally of the plunger 57 within the channel 30. The spring 58 applies a proximal bias force to the plunger 57. The proximal bias force maintains the plunger 57 in contact with the distal surface of the cap 46 (e.g., at a proximal mal end of the channel 30). When positive airflow sufficient to overcome the proximal bias force is provided (for example, via the air supply hose), the plunger 57 is driven distally, compressing the spring 58 and allowing positive airflow from the proximal opening 32a of the channel 30 through the openings 24a, 24b formed in the stem body 16 and into the inner volume of the inflatable mattress 100. When the airflow is stopped or reduced below a level sufficient to overcome the proximal bias force, the spring 58 automatically returns the plunger 57 to the proximal-most position and seals the channel 30, preventing negative airflow from the inner volume of the inflatable mattress 100. The inflatable mattress 100 can be inflated to a first pressure. In some embodiments, the distal end 22b of the channel 30 includes a frame 60 configured to support the spring 58 and prevent the spring 58 and the inflation plunger 57 from exiting the distal end of the channel 30, although it will be appreciated that the plunger 57 and the spring 58 can be maintained within the channel 30 using any suitable retention mechanism.

In some embodiments, the air pressure within the inflatable mattress 100 can be selectively reduced by applying a force to the plunger 57 sufficient to overcome the bias force applied by the spring 58 and advance the plunger 57 distal of a proximal edge 56a of one or more of the openings 24a, 24b. For example, in some embodiments, a user may apply a force using a finger, a tool, and/or any other suitable device to overcome the bias force, compress the spring 58, and advance the plunger 57 in a distal direction. When the plunger 57 is positioned beneath a proximal edge 56a of one or more of the openings 24a, 24b, an airflow path from the inner volume of the inflatable mattress 100 is established and negative airflow reduces the pressure within the inflatable mattress. The plunger 57 can be advanced further in the distal direction to expose more of the openings 24a, 24b above the plunger 57, increasing the airflow rate from the inner volume. Once a desired pressure has been reached, the plunger 57 can be released and the spring 58 returns the plunger to a proximal-most position, sealing the channel 30 and maintaining the inflatable mattress 100 at a second, lower pressure.

Figure 12:
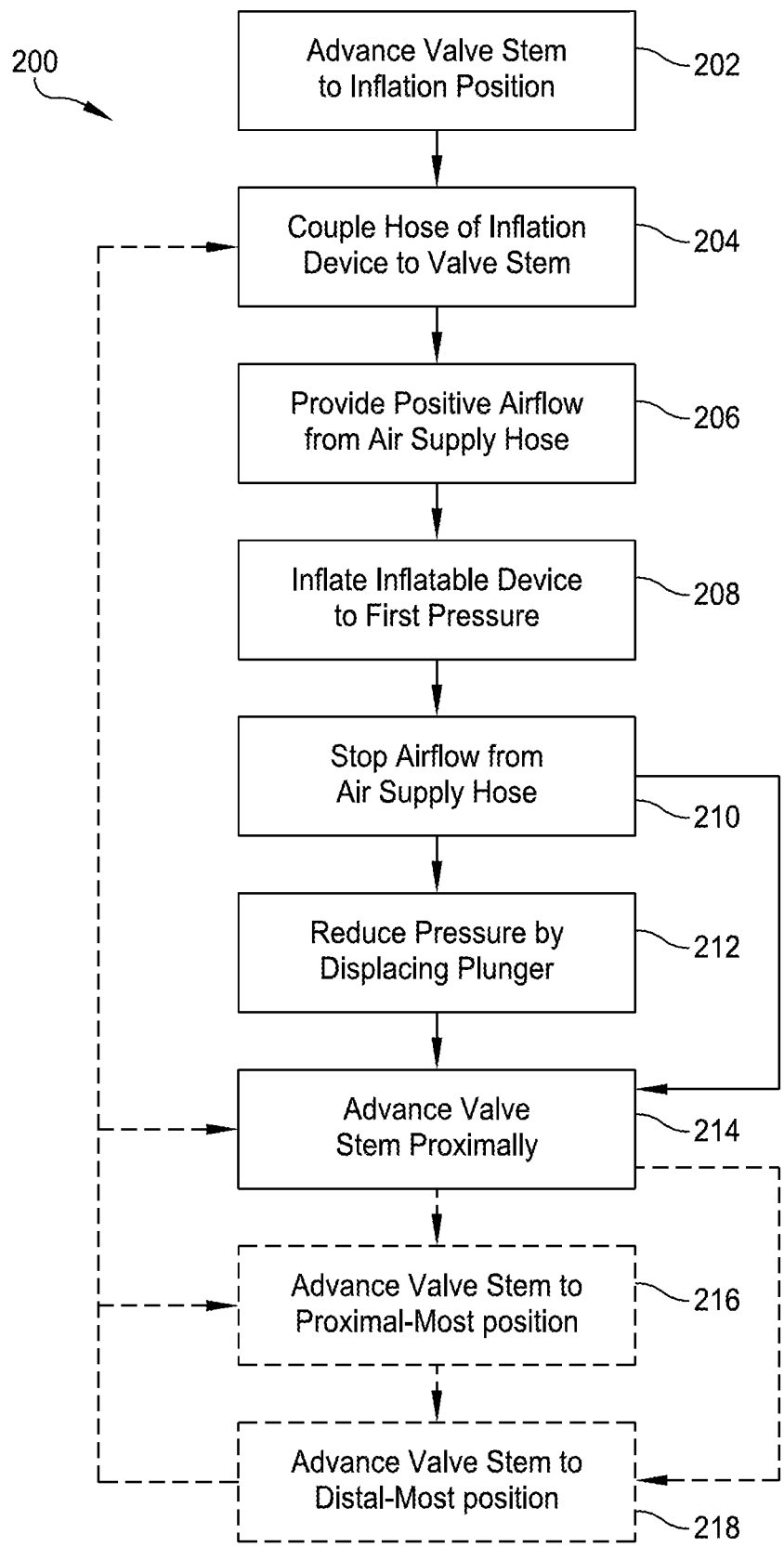
FIG. 12 is a flowchart illustrating a method of inflating and/or deflating an inflatable mattress having a flow control valve, in accordance with some embodiments.

FIG. 12 illustrates a method 200 of inflating and/or deflating an inflatable mattress 100 including a flow control valve 2, in accordance with some embodiments. At step 202, the valve stem 6 is advanced distally within the valve seat to a distal-most (or inflation) position. The openings 24a, 24b formed in the valve stem body 16 are positioned beneath a distal end 12b of the valve seat 4 when the valve stem 6 is in a distal-most position. At step 204, an air supply hose of an inflation device is coupled to a proximal end 22a of the valve stem 6. In some embodiments, a proximal cap 46 is positioned at a proximal end 22a of the valve stem 6 and defines a cap channel 52 sized and configured to couple to the hose of the inflation device.

At step 206, positive airflow from the inflation device drives an inflation plunger 57 from a proximal position to a distal position to allow airflow through the openings 24a, 24b and into an internal volume of the inflatable mattress 100. At step 208, the inflatable mattress 100 is inflated to a first pressure. At step 210, the airflow from the inflation device is stopped, and the inflation plunger 57 is returned to a proximal position, for example, by a biasing element (e.g., spring 58). The inflation plunger 57 forms a seal with a distal surface of the cap 56 and prevents airflow from the internal volume of the inflatable mattress 100 when in the proximal position.

At optional step 212, the pressure within the inflatable mattress 100 is reduced by applying a distal force to the plunger 57 to move the plunger 57 in a distal direction. When the plunger 57 is positioned below an upper edge 26a of the an opening 24a, 24b, air flows from the inner volume to reduce the pressure of the inflatable mattress 100. An additional force can be applied to advance the plunger 57 distally and expose an additional portion of the openings 24a, 24b to increase the airflow rate. After reducing the pressure within the inflatable mattress, the force is removed from the plunger 57 and the plunger is automatically returned to a proximal-most position by a biasing element, such as spring 58.

At step 214, the pressure within the inflatable mattress 100 is reduced by advancing the valve stem 6 proximally to expose a portion of the openings 24a, 24b above the sealing element 40 of the valve seat 4. When a portion of each opening 24a, 24b is exposed above the valve seat 4, air flows from the internal volume to deflate the inflatable mattress. The amount of proximal displacement of the valve stem 6 (and thus the related portion of the openings 24a, 24b exposed) determines the rate of airflow from within the internal volume. At optional step 216, the valve stem 6 is advanced proximally to a full deflation position in which a maximum portion of each opening 24a, 24b is exposed. When in the full deflation position, airflows from the internal volume of the inflatable mattress 100 at a maximum deflation rate.

At optional step 218, the valve stem 6 can be advanced distally to reseal the flow control valve 2 and maintain the inflatable mattress 100 at a second, lower pressure. When the valve stem 6 is advanced distally, the openings 24a, 24b are positioned below the sealing element 40. The inflatable mattress 100 can be maintained at the second pressure, or the method can return to one of steps 206, 210, or 212 to adjust the inflatable mattress 100 to a different pressure.

Although the subject matter has been described in terms of exemplary embodiments, it is not limited thereto. Rather, the appended claims should be construed broadly, to include other variants and embodiments, which may be made by those skilled in the art.

What is claimed is:

1. A valve, comprising:
    a valve seat including a seat body defining a stem cavity and a sealing element;
    a valve stem including a stem body sized and configured for insertion into the stem cavity, the stem body extending between a proximal end and a distal end, wherein the stem body defines a channel extending from the proximal end to the distal end, and wherein the stem body includes at least one opening extending through a surface to the channel; and
    a coupling element defined on the surface of the stem body and configured to provide advancement of the valve stem within the stem cavity in a distal or proximal direction.

2. The valve of claim 1, wherein the at least one opening extends through the surface of the stem body such that the at least one opening is positioned on an opposite side of the sealing element from the proximal end of the valve stem when the valve stem is positioned in a first position.

3. The valve of claim 2, wherein the at least one opening extends through the surface of the stem body such that at least a portion of the at least one opening is positioned on a same side of the sealing element as the proximal end of the valve stem when the valve stem is positioned in a second position.

4. The valve of claim 1, further comprising:
    an plunger positioned within the channel and moveable between a first position and a second position, wherein the plunger is configured to seal a first side of the channel in a first position and allow airflow from the at least one opening to the proximal end of the channel in a second position; and a biasing element configured to apply a biasing force to the plunger.

5. The valve of claim 4, wherein the biasing element is a spring positioned within the channel.

6. The valve of claim 1, wherein the coupling element is configured to provide continuous adjustment of the valve stem from a first position within respect to the valve seat to a second position.

7. The valve of claim 1, further comprising a cap coupled to the valve stem, wherein the cap is configured to couple the valve stem to an air supply hose.

8. The valve of claim 7, wherein the cap comprises at least one adjustment mechanism configured to apply an adjustment force to the valve stem.

9. The valve of claim 1, wherein a sealing flange of the valve seat comprises a radiofrequency bondable material.

10. An inflatable mattress, comprising:
　a mattress body comprising:
　　a top panel having a first perimeter;
　　a bottom panel having a second perimeter, wherein the first perimeter of the top panel is coupled to the second perimeter of the bottom panel; and
　a flow control valve extending through the mattress body, the flow control valve comprising:
　　a valve seat including a seat body defining a stem cavity and a sealing element coupled to the mattress body;
　　a valve stem including a stem body sized and configured for insertion into the stem cavity, the stem body extending between a proximal end and a distal end, wherein the stem body defines a channel extending from the proximal end to the distal end, and wherein the stem body includes at least one opening extending through a surface to the channel; and
　　a coupling element defined on the surface of the stem body and configured to provide advancement of the valve stem within the stem cavity in a distal or proximal direction.

11. The inflatable mattress of claim 10, wherein the at least one opening extends through the surface of the stem body such that the at least one opening is positioned on an opposite side of the mattress body from the proximal end of the valve stem when the valve stem is positioned in a first position.

12. The inflatable mattress of claim 11, wherein the at least one opening extends through the surface of the stem body such that at least a portion of the at least one opening is positioned on a same side of the mattress body as the proximal end of the valve stem when the valve stem is positioned in a second position.

13. The inflatable mattress of claim 10, further comprising:
　an plunger positioned within the stem cavity and moveable between a first position and a second position, wherein the plunger is configured to seal a first side of the stem cavity in a first position and allow airflow from the at least one opening to the proximal end of the stem cavity in a second position; and
　a biasing element configured to apply a biasing force to the plunger.

14. The inflatable mattress of claim 13, wherein the biasing element is a spring positioned within the stem cavity.

15. The inflatable mattress of claim 10, wherein the coupling element is configured to provide continuous adjustment of the valve stem from a first position within respect to the valve seat to a second position.

16. The inflatable mattress of claim 10, further comprising a cap coupled to the valve stem, wherein the cap is configured to couple the valve stem to an air supply hose.

17. The inflatable mattress of claim 16, wherein the cap comprises at least one adjustment mechanism configured to apply an adjustment force to the valve stem.

18. The inflatable mattress of claim 10, wherein the sealing element of the valve seat is coupled to the mattress body by a radiofrequency bondable material.

19. A method, comprising
　coupling an inflation hose to a flow control valve formed integrally with an inflatable device, the flow control valve comprising:
　　a valve seat including a seat body defining a stem cavity and a sealing element,
　　a valve stem including a stem body sized and configured for insertion into the stem cavity, the stem body extending between a proximal end and a distal end, and
　　a coupling element defined on a surface of the stem body and configured to provide advancement of the valve stem within the stem cavity in a distal or proximal direction, wherein the valve stem defines a channel extending from the proximal end to the distal end, and wherein the stem body includes at least one opening extending through the surface to the channel;
　providing a positive air flow from the air supply hose to the flow control valve, wherein the positive air flow moves a plunger positioned within the channel from a first position to a second position, and wherein an airflow path is established between a proximal opening of the channel and the at least one opening extending through the surface of the stem body when the plunger is in the second position;
　inflating the inflatable device using the positive air flow; and
　removing the positive air flow from the air supply hose to the flow control valve, wherein the plunger moves from the second position to the first position when the positive airflow is removed, and wherein the plunger is configured to seal the proximal end of the channel in the first position.

20. The method of claim 19, comprising adjusting the valve stem from a first position to a second position, wherein the at least one opening is positioned on a same side as a proximal end of the valve stem in the second position, and wherein an airflow path is established from a distal opening of the channel to at least a portion of the at least one opening.

* * * * *